(12) United States Patent
Dörfler et al.

(10) Patent No.: US 12,077,082 B2
(45) Date of Patent: Sep. 3, 2024

(54) CIRCUIT ARRANGEMENT FOR CONTROLLING SEAT COMFORT SYSTEMS, SEAT, AND METHOD FOR CONTROLLING A SEAT COMFORT SYSTEM

(71) Applicant: Alfmeier Präzision SE, Treuchtlingen (DE)

(72) Inventors: Erich Dörfler, Landsberg (DE); Matthias Mitzler, Graben (DE)

(73) Assignee: Alfmeier Präzision SE, Treuchtlingen (DE)

( * ) Notice: Subject to any disclaimer, the term of this patent is extended or adjusted under 35 U.S.C. 154(b) by 0 days.

(21) Appl. No.: 17/357,194

(22) Filed: Jun. 24, 2021

(65) Prior Publication Data
US 2021/0402902 A1    Dec. 30, 2021

(30) Foreign Application Priority Data
Jun. 25, 2020    (DE) ............... 10 2020 116 820.9

(51) Int. Cl.
   *B60N 2/90*      (2018.01)
   *B60R 16/037*    (2006.01)
   (Continued)

(52) U.S. Cl.
   CPC ........... *B60N 2/914* (2018.02); *B60R 16/037* (2013.01); *F03G 7/0614* (2021.08); *F16K 31/002* (2013.01); *F16K 31/025* (2013.01)

(58) Field of Classification Search
   CPC ............... B60N 2/914; B60R 16/037; F03G 7/0614–0615; F03G 7/065
   See application file for complete search history.

(56) References Cited

U.S. PATENT DOCUMENTS

| 4,655,505 A | * | 4/1987 | Kashiwamura | ........ B60N 2/914 |
| | | | | 297/284.6 |
| 6,088,643 A | * | 7/2000 | Long | ........ A47C 4/54 |
| | | | | 297/284.3 |

(Continued)

FOREIGN PATENT DOCUMENTS

| DE | 11 2013 007 682 T5 | 9/2016 |
| DE | 10 2016 225 519 A1 | 6/2018 |

(Continued)

OTHER PUBLICATIONS

German Patent and Trademark Office Office Action dated Apr. 9, 2021 with English translation.

*Primary Examiner* — Laert Dounis
(74) *Attorney, Agent, or Firm* — JK Intellectual Property Law, PA

(57) ABSTRACT

A circuit arrangement controls a system for a seat comfort function with at least one air cushion, at least one actuator with at least one adjusting element and at least one SMA element being movable between a first position and a second position. The circuit arrangement includes at least one driver unit with at least one driver to activate the actuator with the at least one SMA element; at least one temperature sensor; and a control unit to control the driver unit, the control unit being configured to generate a control signal to control the driver unit. The control signal is determined from a) at least one actual filling level parameter; b) a temperature signal from the temperature sensor; c) a system parameter; and d) at least one of a target filling level parameter and a target filling level change parameter. A related seat and method of controlling same are also disclosed.

19 Claims, 4 Drawing Sheets

(51) Int. Cl.
  *F03G 7/06* (2006.01)
  *F16K 31/00* (2006.01)
  *F16K 31/02* (2006.01)

(56) References Cited

U.S. PATENT DOCUMENTS

| | | | |
|---|---|---|---|
| 7,748,405 B2 * | 7/2010 | Ghorbal | G05D 23/08 |
| | | | 251/336 |
| 10,948,098 B2 | 3/2021 | Pfahler | |
| 2016/0362023 A1 * | 12/2016 | Dankbaar | A61H 9/0078 |
| 2017/0043681 A1 * | 2/2017 | Seiller | B60N 2/0248 |
| 2017/0240079 A1 * | 8/2017 | Petrovski | B60N 2/5621 |
| 2018/0355991 A1 * | 12/2018 | Pfahler | B60N 2/914 |
| 2020/0378516 A1 | 12/2020 | Beuschel et al. | |

FOREIGN PATENT DOCUMENTS

| | | |
|---|---|---|
| DE | 10 2017 112 803 A1 | 12/2018 |
| WO | 2005/026592 A2 | 3/2005 |

\* cited by examiner

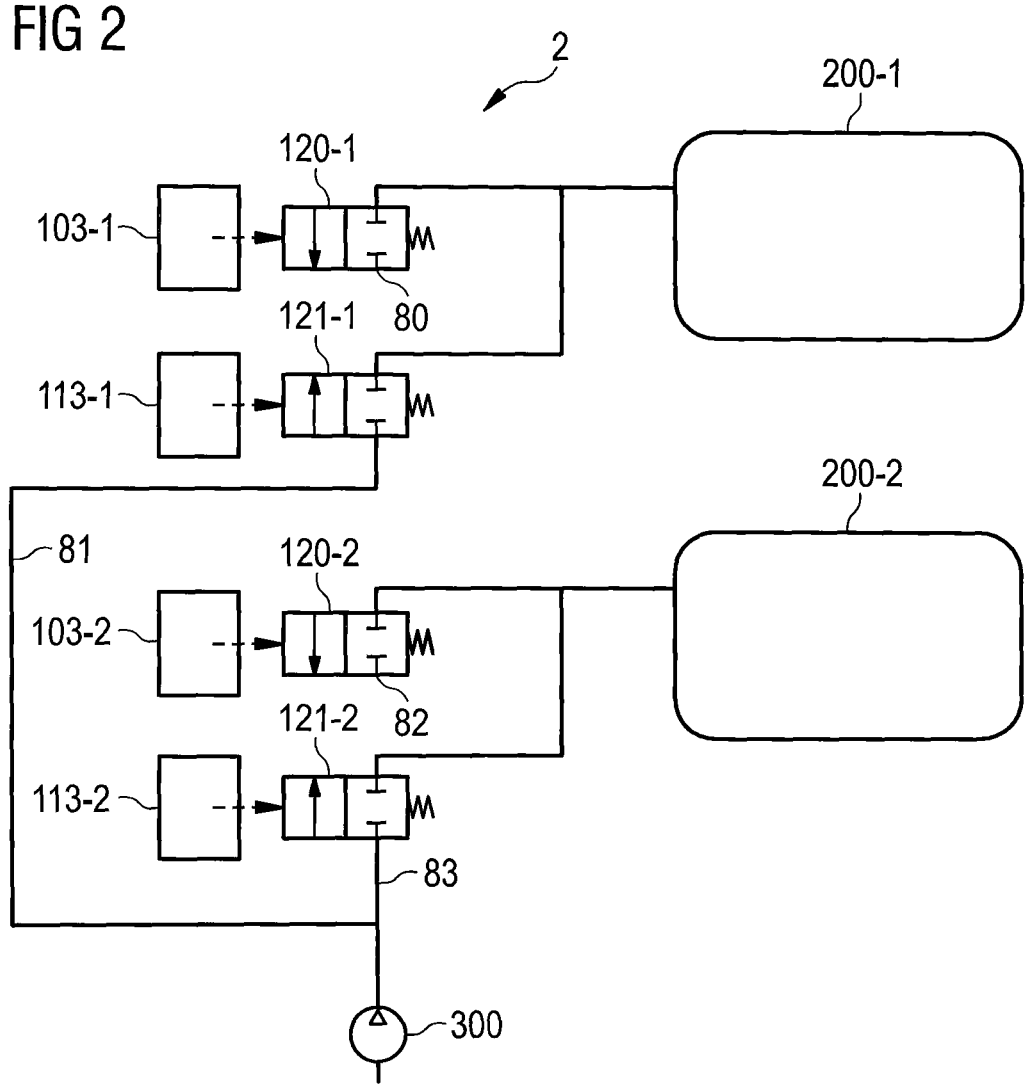

CIRCUIT ARRANGEMENT FOR CONTROLLING SEAT COMFORT SYSTEMS, SEAT, AND METHOD FOR CONTROLLING A SEAT COMFORT SYSTEM

CROSS-REFERENCE TO RELATED APPLICATIONS

This application claims benefit to German Patent Application Number 10 2020 116 820.9, dated Jun. 25, 2020, which is incorporated in its entirety by reference herein.

TECHNICAL FIELD

The disclosure relates to a circuit arrangement for controlling seat comfort systems, a seat, and a method for controlling a seat comfort system.

BACKGROUND

According to the state of the art, a circuit arrangement to control a system, especially a lumbar support with at least two air cushions, is known from DE 10 2017 112 803 A1, for example. Thus, the known circuit is suitable for a seat comfort system.

FIG. 1a shows a circuit arrangement to control a seat comfort system according to the state of the art. A seat comfort system with a pneumatic lumbar support device and/or massage device for a seat, for example, typically encompasses a plurality of air cushions (not shown), to which the desired or time-dependent pressure, where appropriate, can be applied when they are filled. To achieve this, the seat comfort system encompasses a control, a pump (not shown) to apply pressure to the air cushions, and a plurality of valves (not shown), wherein expediently at least one valve is assigned to each air cushion. According to the state of the art, each one of these valves can include an actuator with an SMA element (shape memory alloy element) that, depending on the energization of the valve, moves it to an open, partially opened or closed functional state. Usually, the supplied power must be maintained within a very closely defined range in order to ensure a reliable activation of the actuator while nonetheless preventing a thermal overload and thus a permanent damage of the SMA element. Therefore, a control device must expediently have sensors for monitoring the current, voltage and/or temperature.

The circuit arrangement 1 of FIG. 1a is suitable for controlling a system 2, especially a lumbar support with at least two air cushions (not shown). Such a system encompasses at least two air cushions that include at least one valve, especially at least one valve each.

As shown exemplarily in FIG. 1b, such a valve 120 encompasses one housing 102 and one actuator 103. The housing 102 includes one first opening 105 and a second opening 106. The actuator 103 includes one SMA element 100, which is executed as a V-shaped arranged wire held at ends by crimps 101, and an adjusting element 104 that can be moved with the SMA element 100, which is equipped with a sealing element 108 in order to either open or close the first opening 105. In an initial position of the adjusting element 104, the first opening 105 is opened and in a second position of the adjusting element 104, it is closed. From WO 2005/026592 A2, it is known that such a valve can have a limit switch that is closed when the second position is reached. This limit switch makes it possible to partially or fully reduce the heat output supplied to the wire. A circuit with a temperature sensor that adjusts the heat output to the surrounding temperature is also known from WO 2005/026592 A2.

Alternatively to the actuator with a V-shaped SMA element shown in FIG. 1b, FIG. 1c shows a known actuator 103 with a linear or U-shaped SMA element 100 in which the adjusting element 104 can be formed from a leaf spring, for example, on whose first end the SMA element 100 engages. Here, the sealing element 108 for electively sealing opening 105 can be held to the first end of the adjusting element in a through-hole 104a of the adjusting element 104. In the example shown, the adjusting element 104 is arranged between a base plate 109 and a circuit board 110 or board with its other end, wherein the SMA element 100 can be held and contacted by means of a crimp 101.

The circuit arrangement shown in FIG. 1a is suitable for energizing and switching several SMA elements 100-1 to 100-N. The SMA elements are connected to a voltage source U shown with the arrow. To do this, the circuit arrangement 1 includes a control unit 30. In addition, a temperature sensor 70 can be present to measure the temperature of the SMA elements 100 and/or a voltage sensor 71. The control unit 30 is connected to a pulse width modulation unit 60. By means of the pulse width modulation unit 60, it is possible to control the SMA elements 100 via pulse width modulation, wherein the duty cycle of the pulse width modulation, i.e. the ratio of pulse width to period duration, is set depending on the measured supply voltage and temperature of the duty cycle of the pulse width modulation. A circuit for a pulse width modulation is known, for example, from DE 10 2017 112 803 A1. By means of the respective driver 20-1 to 20-N, it is possible to consecutively energize the assigned SMA element 100-1 to 100-N. Series resistors 21-1 to 21-N can be present to prevent peak currents. Furthermore, the circuit arrangement can also comprise an end switch or a feedback device 38. The feedback device is connected either to the pulse width modulation unit 60 as shown or alternatively to the control unit 30, and is suitable for signaling that a final position of the actuator has been reached, something that is especially mechanically detected, to the pulse width modulation unit 60 or the control unit 30.

From DE 10 2016 225 519 A1, a pneumatic valve having an actuator and movable shut-off elements is known, wherein the actuator is activated by means of an SMA element that can be deformed by electrical heat output. To activate the actuator, an electrical heat output is supplied to the SMA element, whereupon the SMA element deforms in a known way and a specified movement of the shut-off element for opening or closing an air connection is brought about as a result of that. The deformation of the SMA element is reversed when the supply of the electrical heat output is terminated, which causes the specified movement of the SMA element to be reversed. The known actuator also includes a detection unit to detect that a final position has been reached and left. In the embodiment shown, the final position is achieved by bridging a section of the SMA element and measuring a resistance reduced by the bridging.

The known processes are based on the activation of a kind of switch in a certain position of the adjusting element that is accomplished by a toggle switch or a bridging. The functioning of such mechanical switches can be impaired not only by dirt particles, abrasion, and fluids, but also by a high switching frequency.

SUMMARY

The task of the disclosure is to specify a circuit arrangement for seat comfort systems and a seat equipped with seat comfort systems that provides one or more benefits and/or improves on the disadvantages according to the state of the art. In particular, according to certain aspects of the present disclosure, a circuit arrangement that allows a contact-free detection of a switching position of an SMA valve would be desired.

At least one circuit arrangement for controlling a seat comfort system, method of controlling same, and seat, as well as other features and options of same, are made possible using one or more features of the present disclosure.

The circuit arrangement according to the disclosure serves to control a system for a seat comfort function having at least one air cushion, comprising at least one actuator with at least one adjusting element and at least one SMA element, wherein the adjusting element can be moved between a first position and a second position. Within the meaning of this patent application, the first position and second position are two positions separate from one another that can be selected as opening and closing position or intermediate positions.

The circuit arrangement also encompasses at least one driver unit to activate the actuator with the at least one SMA element, at least one temperature sensor and a control unit to control the driver unit. The driver unit includes one or several drivers. The SMA element or elements assigned to the driver are energized by it. In this way, the supply of electrical power to the SMA elements—especially with regard to current strength and/or voltage and/or pulse width modulation—is controlled via the control unit, especially by the driver or drivers.

In addition, the circuit arrangement is especially designed for measuring electrical power in the SMA element. To do this, the circuit arrangement can have a current sensor and/or a voltage sensor to record the electrical power of the SMA element.

The control unit has been designed to generate a control signal for controlling the driver unit, wherein the control signal is determined by:
  at least one actual filling level parameter;
  a temperature signal of the temperature sensor; and
  a system parameter;
  optionally, an electrical power and/or voltage and/or current strength applied to the SMA element; and
  a target filling level parameter and/or target filling level change parameter.

Furthermore, the control signal is optionally determined from the current intensity determined by means of the current sensor and/or the voltage recorded by means of the voltage sensor and/or the recorded electrical power.

Thus, the circuit arrangement according to the disclosure encompasses no limit switch; instead, the control has been designed in such a way that even brief excessive uses of the system are prevented. The circuit without limit switch is therefore designed to control or regulate electrical power.

The temperature sensor is, in particular, a sensor that has been especially arranged in a housing of the SMA element, so that the surrounding temperature of the SMA element can be measured. The SMA elements are typically arranged so that when the air cushions are filled or emptied, they come directly or at least indirectly in contact with the air current, thereby cooling the SMA elements.

The target filling level is the filling level of the air cushions that should be reached and that is described by one or several target filling level parameters. The actual filling level is the real filling level described by one or several actual filling level parameters. Alternatively to an absolute target filling level, a desired filling level change can also be entered in the control signal. This desired filling level change is described by means of one or several target filling level change parameters. System parameters are understood to be parameters that are the fixed parameters of the system that influence the filling or emptying speed of the air cushions. The following system parameters are also understood to be those parameters like flow speed, duration, air pressure on the SMA element, etc. that characterize the heat transfer between the air flow, i.e. a volume flow during filling or emptying, and the SMA elements, especially heat transfer profiles.

Expediently, the control unit is connected to one or several pressure sensors to measure an air cushion pressure and/or a current sensor and/or a voltage sensor. The current sensor is especially a current sensor that measures the electrical current of the pump. The control unit can be connected to a current sensor, which measures the current of the SMA elements, and/or to a current sensor, which measures the electrical current of the pump. The voltage sensor is especially a sensor that measures the voltage applied to the SMA wires or their supply line.

In one possible design, the actual filling level parameters include one or several parameters from air cushion pressure, surrounding temperature, pump delivery amount, air cushion volume, and volume flow of a supply line or of an outlet. The outlet can be an outlet opening of an air cushion, an output line or a venting device. Furthermore, a voltage applied to one of the SMA elements can also be considered as actual level parameter. If this voltage is basically constant in the system, it can also be alternately considered as system parameter.

In another possible design, the target filling level parameter or parameters have a pressure in an air cushion and/or an air volume in the air cushion and/or a contour of the air cushion to be achieved. The target filling level change parameters can include an air volume to be supplied to the air cushion, an air volume to be purged from the air cushion, an emptying time or a filling time or pump runtime.

In a further design, the system parameters include one or several ones consisting of a number of air cushions, an air cushion volume, a pump characteristic, a characteristic of a venting device, valve properties, heat transfer profiles, electrical resistances or wiring.

Expediently, the circuit arrangement also encompasses a memory that serves, in particular, to store system parameters.

In a further design, the control unit is designed for controlling by means of pulse width modulation, especially for controlling the performance via pulse width modulation.

In another design, the control unit can be equipped with a switch for adjusting a target level, a target level change and/or with a network interface, especially a LIN interface, CAN interface, or another known wired or wireless interface.

Furthermore, the circuit arrangement can include an application-specific integrated circuit that has one or several of the following components: driver, memory, network interface, or control unit.

The process according to the disclosure to control a circuit arrangement, especially a circuit arrangement according to the disclosure, encompasses:
  recording at least one actual filling level parameter;
  recording a temperature signal;
  recording one or several target filling level parameters and/or target filling level change parameters;
  generating a control signal from:
  the at least one actual filling level parameter;
  the temperature signal;

a system parameter; and
the at least one target filling level parameter and/or target filling level change parameter; and
controlling the driver unit.

The method according to the disclosure can be carried out especially with the circuit arrangement according to the disclosure and dispenses with an endpoint detection in form of a mechanical switch. To determine the control signal, a table can be used in which a control signal is stored to the plurality of individual input parameters, i.e. actual filling level parameters, target filling level parameters, target filling level change parameters and system parameters. Alternately, a formula that is stored can be determined through simulation. The input parameters are then read in the formula, from which one or several output values are calculated in an evaluation unit for use as a control signal.

The method furthermore encompasses expediently the recording of an electrical power that is supplied to the SMA element or elements, or voltage applied to the SMA element, or current intensity to energize the SMA element. The recorded electrical power and/or voltage and/or current intensity is used to determine the control signal. In addition, a resistance—which can be used to determine the control signal—can be optionally determined from the voltage applied to the SMA elements and a current intensity in the SMA elements. Alternately or additionally, other values from current intensity and voltage can also be used.

The actual filling level parameter or parameters comprise one or several parameters from air cushion pressure, surrounding temperature, pump delivery amount, air cushion volume, and volume flow of a supply line or an outlet. The actual level parameters are, in particular, periodically or continuously monitored at the start of the control process.

In a design, the target filling level parameter or parameters comprise a pressure in an air cushion and/or an air volume in the air cushion and/or a contour of the air cushion to be reached. The target filling level change parameters can comprise an air volume to be supplied to the air cushion, an air volume to be purged from the air cushion, an emptying time or filling time or pump runtime.

The system parameters comprise expediently one or several ones from number of air cushions, air cushion volume, pump characteristic, characteristic of a venting device, valve properties, heat transfer profiles or wiring. The values derived from the above-mentioned ones that are known to the technician can be used as an alternative.

In a design, the process also includes the entering of system parameters via an input unit or a network interface or the reading of system parameters stored in a memory.

In another design, the method encompasses a control of an operating temperature of the SMA element or elements. To do this, electrical power can be supplied to the SMA element, the SMA elements can be cooled, especially in form of heat transfer profiles and/or an air volume can be supplied or purged, and a surrounding temperature can be considered. In this way, it can be especially ensured that the SMA elements will not exceed a threshold temperature, especially in the short term. An overuse of the SMA elements can be prevented in this way.

In another design, the method encompasses a control by means of pulse width modulation, especially the control of a performance by means of pulse width modulation.

The seat according to the disclosure encompasses a seat comfort system with the circuit arrangement.

BRIEF DESCRIPTION OF THE DRAWINGS

The disclosure will be explained in a more detailed way below, also with regard to additional features and advantages, by describing embodiments and with the help of the enclosed drawings, showing in each case in a schematic sketch:

FIG. 2 is a schematic view of one design of a seat comfort system.

DETAILED DESCRIPTION

Figure 1A:
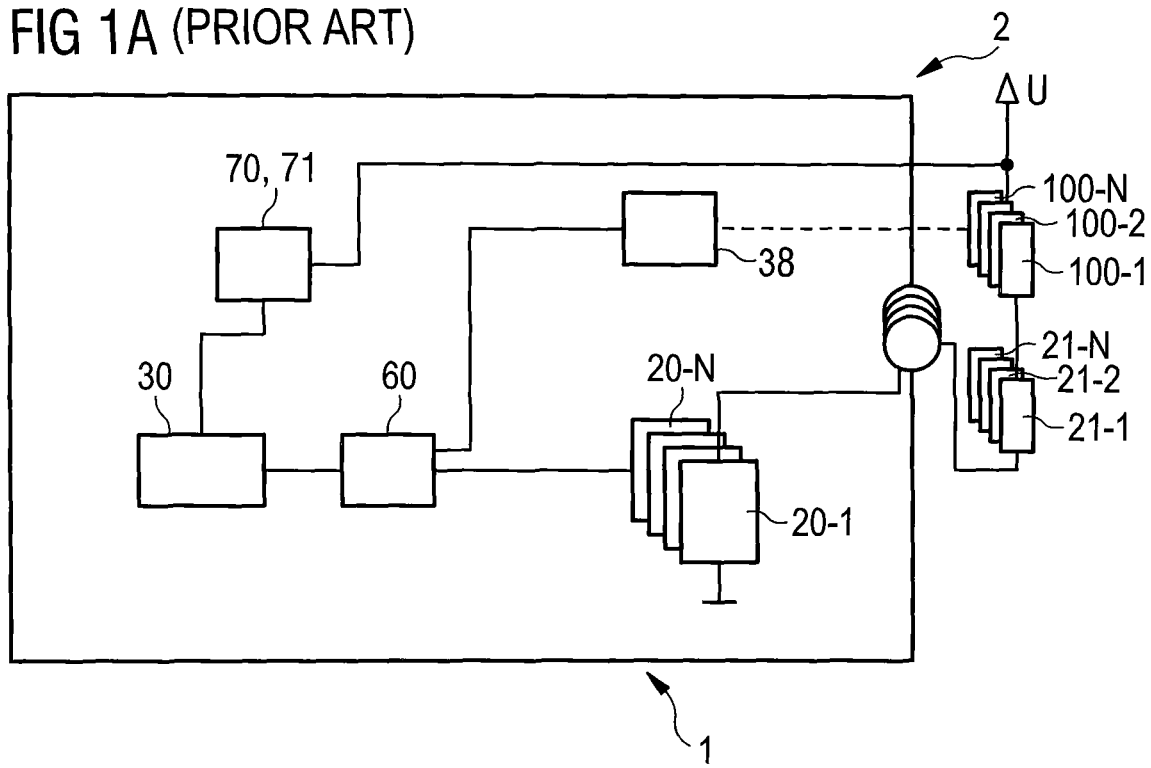
FIG. 1a is a schematic view of a circuit arrangement according to the state of the art.
Figure 1B:
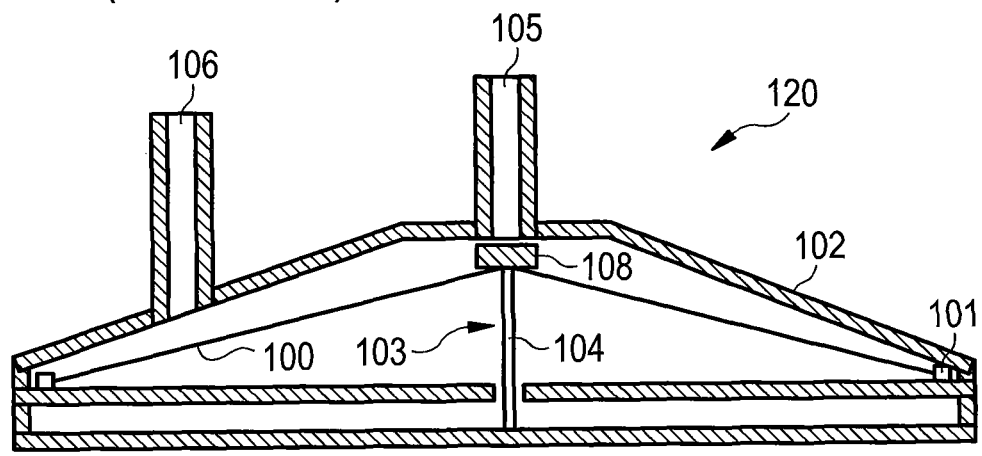
FIG. 1b is a cross-sectional view of an SMA valve with an actuator according to the state of the art.
Figure 1C:
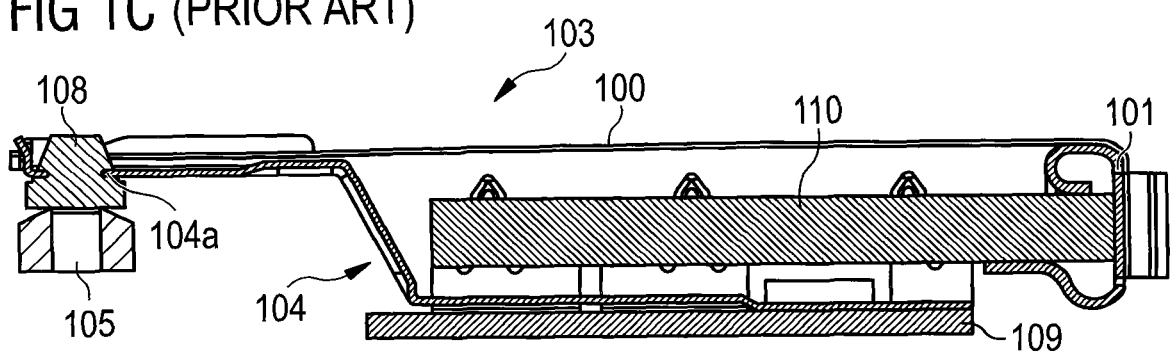
FIG. 1c is a cross-sectional view of an alternative design of an actuator according to the state of the art.

FIG. 2 shows a design of a seat comfort system having two air cushions 200-1, 200-2. The air cushions 200-1, 200-2 are connected to a pump 300, in each case through supply lines 81, 83 and input valves 121-1, 121-2. The input valves 121-1, 121-2 are valves that have one SMA element. They can include, for example, an actuator, as shown in FIG. 1b or 1c. The valves 121-1 and 121-2 are driven by drivers 113-1 and 113-2. The drivers 113-1 and 113-2 are part of a circuit arrangement according to the disclosure.

FIG. 2 also shows that each one of the air cushions 200-1, 200-2 is connected to an outlet valve 120-1, 120-2. Each outlet valve is connected to an output line 80, 82. The outlet valves 120-1, 120-2 are in each case operationally connected to a driver 103-1 and 103-2. The drivers 103-1 and 103-2 are also part of the circuit arrangement according to the disclosure. The air cushions 200-1 and 200-2, in particular, are part of the lumbar support device and built into the back rest of a seat, especially a car seat. Here, the outlet valves together with the output lines 80, 82, constitute the venting device.

Figure 3:
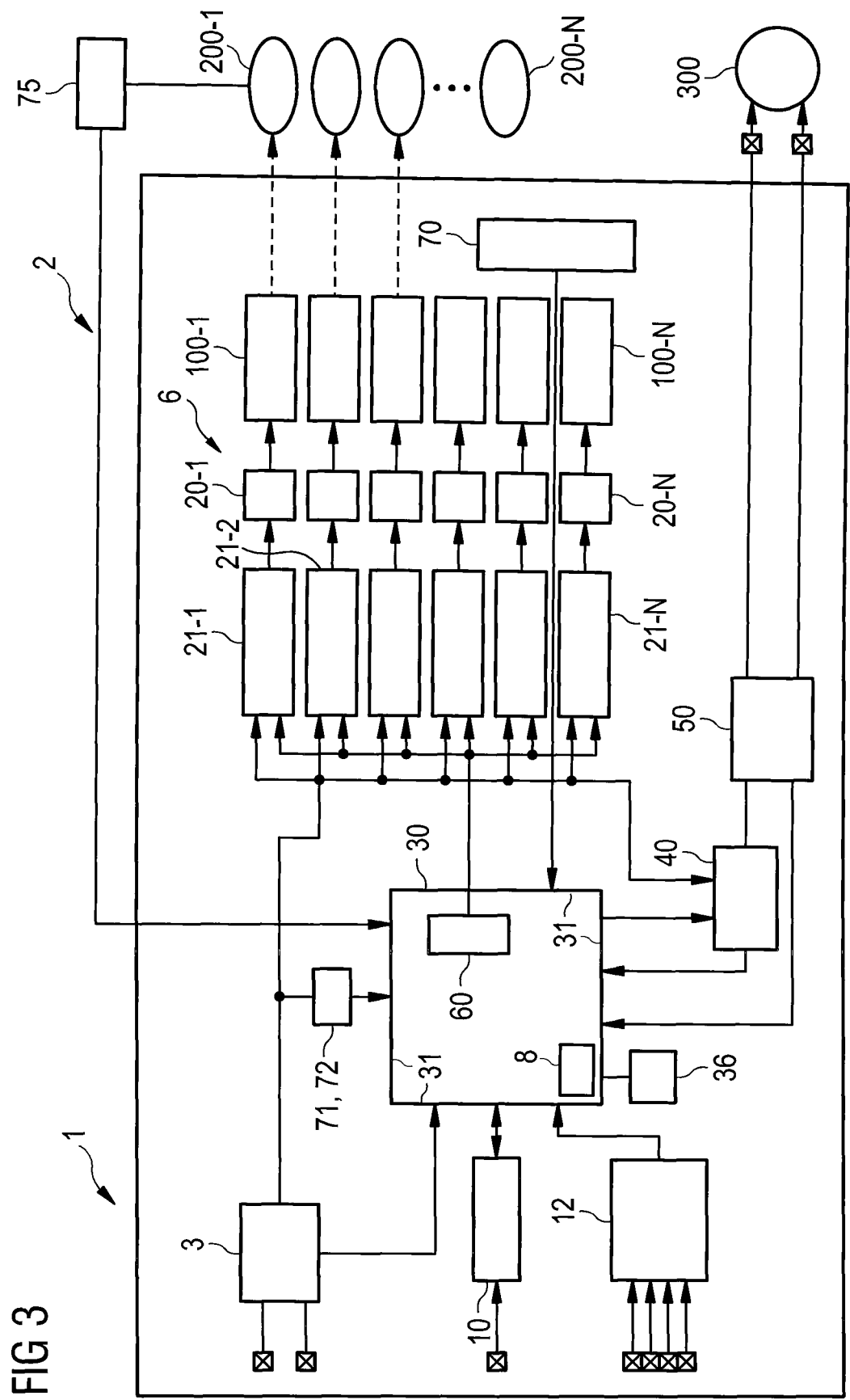
FIG. 3 is a schematic view of one possible circuit arrangement.

FIG. 3 shows the structure of the circuit arrangement 1 for a seat comfort system as shown in FIG. 2.

One component of the circuit arrangement is the control unit 30. The control unit 30 can include a pulse width modulation unit 60 or be connected to one, as well as an evaluation unit (processor) 8.

On the input side, the control unit 30 can be connected to a network interface such as a LIN communication interface 10 and/or switch 12 as input device. Moreover, the control unit 30 can be optionally connected on the input side to an LDO 3 (low-dropout voltage regulator), which if present, is then connected to the SMA elements as well.

On the output side, the control unit 30 is connected to the driver unit 6 and actuators. In other words, the control unit 30 is connected to most, especially to all, drivers 20-1, . . . 20-N, which are connected to the individual SMA elements 100-1, . . . 100-N. A series resistance 21-1, . . . 21-N can in each case still be switched between control unit 30 and respective driver 20. The control unit 30 emits a control signal to the drivers 20, which is determined by the evaluation unit 8 from at least one actual filling level parameter, a temperature signal of the temperature sensor, a system parameter, and at least a target filling level parameter and a target filling level change parameter.

In the area of the SMA elements, one or several temperature sensors 70 that measure a temperature in the vicinity of the SMA elements have been arranged especially in a housing enclosing the individual, several or all SMA elements. An output signal of the temperature sensor or sensors is an input signal for the control unit and is received as temperature signal to determine the control signal.

The control unit 30 is furthermore connected to the pump 300 via a pump driver 40. A pumping capacity of the pump 300 can be adjusted through the pump driver 40. A pumping capacity dependent on the current and/or the pressure already present in the cushions can be stored in a memory 36 of the control unit or also read from a memory element of the pump or via a memory attached to a network connection. The memory 36 can be arranged in the control unit 30 or be connected with the control unit 30. The control unit 30 can be monitored via the current sensor 50. In this design, a signal of the current sensor 50 can be received not only to regulate the pump itself, but also to determine the control signal as actual filling level parameter.

Furthermore, the control unit 30 is connected to a voltage sensor 71. The voltage sensor 71 is arranged in such a way that it is able to measure the supply voltage of the SMA elements 100.

Furthermore, the control unit 30 is alternately or additionally connected to a current sensor 72. The current sensor 72 is arranged in such a way that it is able to measure the current intensity on the SMA elements 100.

As shown in the design, the control unit 30 can also be connected to one or several pressure sensors 75. By means of the pressure sensor or sensors 75, it is possible to determine a pressure in the individual air cushions 200-1, . . . 200-N. The pressure that is determined is received as actual filling level parameter to determine the control signal.

Figure 4:
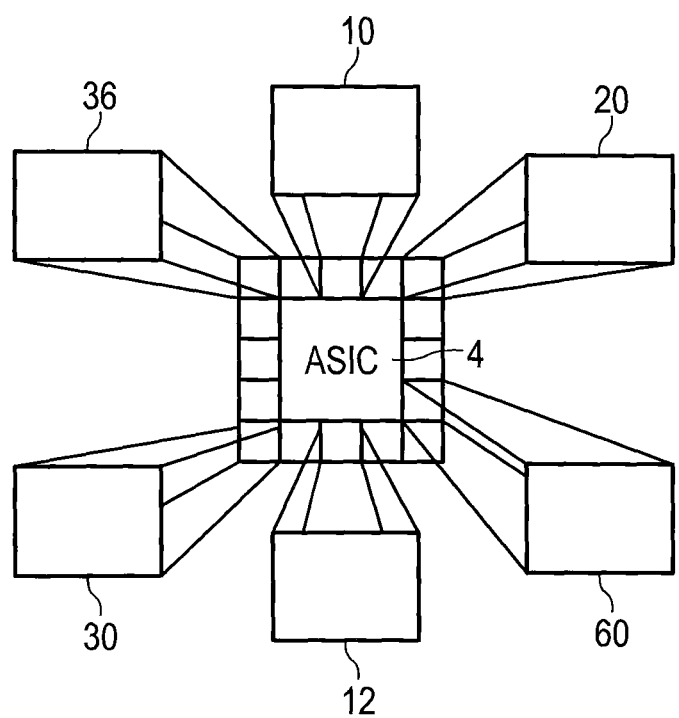
FIG. 4 is a schematic view of one possible application specific integrated circuit (ASIC) arrangement.

FIG. 4 shows an ASIC 4. This ASIC 4 can include one or several of the following: driver 20, memory 36, control unit 30, pulse width modulation unit 60, and network interface 10, as well as an input interface for a switch 12.

LIST OF REFERENCE CHARACTERS

1 Circuit arrangement
2 System
3 LDO
4 ASIC
6 Driver unit
8 Evaluation unit
10 LIN
12 Switch
20 SMA driver
21 Series resistance
30 Control unit
31 Input
36 Memory
38 Feedback device
40 Pump driver
50 Current sensor
60 Pulse width modulation unit
70 Temperature sensor
71 Voltage sensor
72 Current sensor
75 Pressure sensors
80, 81, 82, 83 Supply line
100 SMA element
101 Crimp
102 Valve housing
103, 113 Actuator
104 Adjusting element
104a Through-hole
105 First opening
106 Second opening
108 Sealing element
109 Base plate
110 Circuit board
120, 121 Valve
200 Air cushion
300 Pump
U Voltage source

The invention claimed is:

1. A circuit arrangement for controlling a system for a seat comfort function with at least one air cushion, at least one actuator with at least one adjusting element and at least one SMA element, the adjusting element being movable between a first position and a second position, the circuit arrangement comprising:
at least one driver unit with at least one driver to activate the actuator with the at least one SMA element;
at least one temperature sensor; and
a control unit to control the driver unit, the control unit being configured to generate a control signal to control the driver unit,
wherein the at least one SMA element is energized by the at least one driver,
wherein the supply of electrical power from the at least one driver to the at least one SMA element is controlled by the control unit,
wherein the control signal is determined from:
a) at least one actual filling level parameter;
b) a temperature signal from the temperature sensor;
c) a system parameter; and
d) at least one of a target filling level parameter and a target filling level change parameter, and
wherein the control unit is configured to prevent brief excessive uses of the SMA element, and
wherein the circuit arrangement allows for a contact-free determination of a switching position of the actuator.

2. The circuit arrangement according to claim 1, wherein the control signal is further determined from at least one of an electrical power level, a voltage level, and a current level applied to one of the at least one SMA elements.

3. The circuit arrangement according to claim 1, wherein the control unit is connected to at least one pressure sensor to measure an air cushion pressure, one or more current sensors, and a voltage sensor.

4. The circuit arrangement according to claim 1, wherein the actual filling level parameter includes at least one parameter, selected from an air cushion pressure, a surrounding temperature, a pump delivery amount, an air cushion volume, and a volume flow of a supply line or an outlet.

5. The circuit arrangement according to claim 1, wherein the target filling level parameter encompasses at least one parameter selected from a pressure in the at least one air cushion, an air volume in the air cushion, and a target contour of the air cushion, and wherein the target filling level change parameter includes at least one parameter elected from an air volume to be supplied to the air cushion, an air volume to be purged from the air cushion, a filling time, and an emptying time.

6. The circuit arrangement according to claim 1, wherein the system parameter encompasses at least one of a number of air cushions, an air cushion volume, a pump characteristic, a characteristic of a venting device, valve properties, heat transfer profiles, electrical resistances, and wiring.

7. The circuit arrangement according to claim 1, further including a memory, wherein the memory is configured for storing system parameters.

8. The circuit arrangement according claim 1, wherein the control unit is configured control using pulse width modulation, wherein the pulse width modulation is configured for controlling the performance of the at least one SMA element.

9. The circuit arrangement according claim 1, wherein the control unit includes a switch to adjust one of a target level or a target level change, and wherein the control unit has a network interface.

10. The circuit arrangement according to claim 1, further including an application-specific integrated circuit, which has at least one of the at least one driver, a memory, a network interface, a switch interface, and the control unit.

11. A method to control a circuit arrangement according to claim 1, the method comprising the steps of:
   recording at least one actual filling level parameter;
   recording a temperature signal;
   recording at least one of a target filling level parameter and a target filling level change parameter;
   generating a control signal from:
   a) the at least one actual filling level parameter;
   b) the temperature signal;
   c) a system parameter; and
   d) at least one of the target filling level parameter and the target filling level change parameter; and
   controlling the driver unit using the control signal.

12. The method according to claim 11, further including recording one of a power or a voltage applied to the at least one SMA element, the control signal being additionally determined from at least one of the recorded power, the recorded voltage, and a current intensity applied to the at least one SMA element.

13. The method according to claim 11, wherein the actual filling level parameter includes at least one parameter selected from an air cushion pressure, a surrounding temperature, a pump delivery amount, an air cushion volume, and a volume flow of a supply line or an outlet.

14. The method according to claim 11, wherein the target filling level parameter includes at least one parameter selected from a pressure in at least one air cushion, an air volume in at least one air cushion, a target contour of the air cushion, and the target filling level change parameter includes at least one parameter selected from an air volume to be supplied to the air cushion, an air volume to be purged from the air cushion, a filling time, and an emptying time.

15. The method according to claim 11, wherein the system parameters include at least one selected from a number of air cushions, an air cushion volume, a pump characteristic, a characteristic of a venting device, valve properties, heat transfer profiles, electrical resistances, and wiring.

16. The method according to claim 11, further including one of inputting of system parameters via one of an input unit or a network interface, or reading of system parameters stored in a memory.

17. The method according to claim 11, wherein the method includes using pulse width modulation, wherein the pulse width modulation is used to control the power supplied to the at least one SMA element.

18. The method according to claim 11, wherein the method includes regulating an operating temperature of the at least one SMA element.

19. A seat with a seat comfort system having a circuit arrangement according to claim 1.

* * * * *